United States Patent
Cho et al.

(10) Patent No.: US 12,066,832 B2
(45) Date of Patent: Aug. 20, 2024

(54) METHOD AND APPARATUS WITH COMPLEX-VALUED ATTENTION NETWORK

(71) Applicant: SAMSUNG ELECTRONICS CO., LTD., Suwon-si (KR)

(72) Inventors: Hyunwoong Cho, Seoul (KR); Woosuk Kim, Hwaseong-si (KR); Jong-Sok Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 17/138,411

(22) Filed: Dec. 30, 2020

(65) Prior Publication Data
US 2021/0389777 A1     Dec. 16, 2021

(30) Foreign Application Priority Data
Jun. 12, 2020   (KR) .................... 10-2020-0071459

(51) Int. Cl.
*G05D 1/00* (2006.01)
*B60W 10/04* (2006.01)
*B60W 10/20* (2006.01)

(52) U.S. Cl.
CPC ........... *G05D 1/0257* (2013.01); *B60W 10/04* (2013.01); *B60W 10/20* (2013.01);
(Continued)

(58) Field of Classification Search
CPC .............. B60W 60/001; B60W 10/20; B60W 2050/0075; B60W 2050/0006; B60W 2050/0091; B60W 10/04; B60W 10/18; B60W 50/023; B60W 2050/0031; B60W 50/0098; B60W 2050/0088; G06N 3/08
(Continued)

(56) References Cited

U.S. PATENT DOCUMENTS

| 5,777,573 A * | 7/1998 | Klausing ............... G01S 13/904 |
| | | 342/25 F |
| 8,855,848 B2 * | 10/2014 | Zeng .................... G01S 13/865 |
| | | 701/28 |

(Continued)

FOREIGN PATENT DOCUMENTS

| JP | 2007-093221 A | 4/2007 |
| JP | 2014-052214 A | 3/2014 |

(Continued)

OTHER PUBLICATIONS

Ceylan, Murat "Combined Complex-Valued Artificial Neural Network (COVANN)" *Proceedings of the World Congress on Engineering 2011* vol. II Jul. 2011 pp. 1-5.

(Continued)

*Primary Examiner* — Angela Y Ortiz
*Assistant Examiner* — Jean W Charleston
(74) *Attorney, Agent, or Firm* — NSIP Law

(57) ABSTRACT

A processor-implemented method of performing an operation using a complex-valued attention network includes: extracting a complex-valued attention weight from complex-valued input data; and determining complex-valued attention data by applying the extracted complex-valued attention weight to the complex-valued input data.

24 Claims, 12 Drawing Sheets

(52) U.S. Cl.
CPC ... *B60W 2420/408* (2024.01); *B60W 2710/20* (2013.01); *B60W 2720/10* (2013.01); *B60W 2720/106* (2013.01); *B60W 2720/12* (2013.01); *B60W 2720/125* (2013.01)

(58) Field of Classification Search
USPC .......................................................... 701/23
See application file for complete search history.

(56) References Cited

U.S. PATENT DOCUMENTS

| | | | |
|---|---|---|---|
| 9,983,294 | B2 | 5/2018 | Oshima et al. |
| 2004/0139140 | A1* | 7/2004 | Becker .................. G06F 7/4806 708/650 |
| 2016/0132768 | A1* | 5/2016 | Ray .......................... G06N 3/08 706/22 |
| 2017/0299713 | A1* | 10/2017 | Bevier .................... G01S 13/90 |
| 2018/0031671 | A1* | 2/2018 | Alexander ............ G01S 5/0072 |
| 2018/0099667 | A1* | 4/2018 | Abe ..................... B60W 30/025 |
| 2019/0294929 | A1* | 9/2019 | Yao ....................... G06F 18/217 |
| 2019/0383945 | A1 | 12/2019 | Wang et al. |
| 2020/0003886 | A1* | 1/2020 | Cho ....................... G06N 3/045 |
| 2020/0410318 | A1* | 12/2020 | del Mundo ............ G06N 3/045 |
| 2021/0255304 | A1* | 8/2021 | Fontijne ................. G06V 20/58 |

FOREIGN PATENT DOCUMENTS

| | | |
|---|---|---|
| KR | 10-2019-0137801 A | 12/2019 |
| KR | 10-2020-0010640 A | 1/2020 |

OTHER PUBLICATIONS

Dominik Kellner, et al., "Instantaneous Ego Motion Estimation Using Multiple Doppler Radars" *2014 IEEE International Conference on Robotics and Automation (ICRA)* Sep. 29, 2014 pp. 1-6.

Chang Yu Hu, "Inverse Synthetic Aperture Radar Imaging Using Complex-Value Deep Neural Network", *IET International Radar Conference (IRC 2018)*, May 7, 2019 pp. 7096-7099.

Akira Hirose, "Complex-Valued Neural Network: Advances and Applications" *MLMVN for Brain-Computer Interfacing* 2012 pp. 185-208.

Dominik Kellner, et al., "Instantaneous Ego Motion Estimation Using Doppler Radar" *16th International IEEE Conference on Intelligent Transportation Systems* (ITSC 2013) Jan. 30, 2014 pp. 1-6.

Christopher Grimm, et al., "Hypothesis Test for the Detection of Moving Targets in Automotive Radar", *2017 IEEE International Conference on Microwaves, Antennas, Communications and Electronic Systems (COMCAS)* Nov. 2017 pp. 1-6.

Barjenbruch, Michael. "Joint spatial- and Doppler-based ego-motion estimation for automotive radars" *2015 IEEE Intelligent Vehicles Symposium (IV)* Aug. 27, 2015.

Sarah H. Cen, et al., "Precise Ego-Motion Estimation with Millimeter-Wave Radar Under Diverse and Challenging Conditions", *2018 IEEE International Conference on Robotics and Automation (ICRA)*, Sep. 13, 2018 IEEE International Conference.

* cited by examiner

METHOD AND APPARATUS WITH COMPLEX-VALUED ATTENTION NETWORK

CROSS-REFERENCE TO RELATED APPLICATION

This application claims the benefit under 35 USC § 119(a) of Korean Patent Application No. 10-2020-0071459 filed on Jun. 12, 2020, in the Korean Intellectual Property Office, the entire disclosure of which is incorporated herein by reference for all purposes.

BACKGROUND

1. Field

The following description relates to a method and apparatus with a complex-valued attention network.

2. Description of Related Art

Advanced driver-assistance systems (ADAS) are assistance systems to enhance safety and convenience of a driver and to support driving for the purpose of avoiding a dangerous situation, using sensors installed inside or outside a vehicle.

Sensors used in an ADAS may include, for example, a camera, an infrared sensor, an ultrasonic sensor, a light detection and ranging (lidar), and a radar. Among these sensors, the radar may stably measure an object in a vicinity of a vehicle regardless of a surrounding environment such as weather, in comparison to an optical-based sensor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method of performing an operation using a complex-valued attention network includes: extracting a complex-valued attention weight from complex-valued input data; and determining complex-valued attention data by applying the extracted complex-valued attention weight to the complex-valued input data.

The determining of the complex-valued attention data may include individually applying a real value and an imaginary value of the extracted complex-valued attention weight to real data and imaginary data of the complex-valued input data.

The individually applying of the real value and the imaginary value of the extracted complex-valued attention weight to the real data and the imaginary data of the complex-valued input data may include: normalizing a magnitude of the complex-valued attention weight while preserving a phase of the complex-valued attention weight; and applying the normalized weight of the complex-valued attention weight to the real data and the imaginary data for each channel.

The applying of the normalized weight may include: applying a real value of the normalized weight of the complex-valued attention weight to a real input map of the complex-valued input data for each channel; and applying an imaginary value of the normalized weight of the complex-valued attention weight to an imaginary input map of the complex-valued input data for each channel.

The normalizing of the magnitude of the complex-valued attention weight may include: determining phase information of the complex-valued attention weight for each channel; and determining a bounded magnitude of the complex-valued attention weight within a threshold range for each channel.

The method may include applying the calculated phase information and the calculated bounded magnitude to the complex-valued input data through an element-wise multiplication.

Values of the normalized weight may correspond to an inner region of a circle having a radius that is a threshold corresponding to the threshold range in a complex plane.

The determining of the phase information may include dividing the complex-valued attention weight by an absolute value of the complex-valued attention weight for each channel, and the determining of the bounded magnitude may include applying an activation function to the absolute value of the complex-valued attention weight for each channel.

The extracting of the complex-valued attention weight may include determining the complex-valued attention weight by extracting a value indicating a real component and a value indicating an imaginary component from the complex-valued input data for each channel.

The determining of the complex-valued attention weight may include: performing pooling on a real representative value representing a real component and an imaginary representative value representing an imaginary component from the complex-valued input data for each channel; generating downscaled data by applying a convolution operation of reducing a number of channels to a result of the pooling including the real component and the imaginary component; and determining the complex-valued attention weight by applying a convolution operation of increasing a number of channels to the downscaled data.

The method may include: obtaining raw radar data based on a radar signal sensed by a radar sensor; and generating the complex-valued input data by transforming the raw radar data.

The obtaining of the raw radar data may include obtaining an angle-velocity map for each range channel as the complex-valued input data.

The method may include determining ego-motion information of the radar sensor from the complex-valued attention data based on an ego-motion estimation model.

The determining of the ego-motion information may include determining an acceleration with respect to at least one axis together with a velocity and an angular velocity of the radar sensor as the ego-motion information.

The determining of the ego-motion information may include determining the ego-motion information from residual data between the complex-valued input data and the complex-valued attention data based on the ego-motion estimation model.

The method may include controlling any one or any combination of a velocity, an acceleration, and steering of a vehicle in which the radar sensor is mounted, based on the ego-motion information.

The method may include: determining at least one of a position and a heading direction of a vehicle in which the radar sensor is mounted, based on the ego-motion information; and outputting an estimation result for at least one of the position and the heading direction.

The method may include determining residual data by summing the complex-valued input data and the complex-valued attention data, and applying a complex-valued attention network-based operation to the residual data.

A non-transitory computer-readable storage medium may store instructions that, when executed by a processor, configure the processor to perform the method.

In another general aspect, a computing apparatus includes: a memory configured to store a complex-valued attention network model; and a processor configured to extract a complex-valued attention weight from complex-valued input data using a first layer of the complex-valued attention network model, and determine complex-valued attention data by applying the extracted complex-valued attention weight to real data and imaginary data of the complex-valued input data using a second layer of the complex-valued attention network model.

In another general aspect, a radar data processing apparatus includes: a radar sensor configured to obtain raw radar data by radiating and receiving a radar signal; and a processor configured to generate complex-valued input data from the raw radar data, extract a complex-valued attention weight from the complex-valued input data, and determine complex-valued attention data by applying the extracted complex-valued attention weight to real data and imaginary data of the complex-valued input data.

In another general aspect, a vehicle includes: a radar sensor configured to obtain raw radar data by radiating and receiving a radar signal; and a processor configured to generate complex-valued input data from the raw radar data, extract a complex-valued attention weight from the complex-valued input data, determine complex-valued attention data by applying the extracted complex-valued attention weight to real data and imaginary data of the complex-valued input data, determine ego-motion information of the vehicle from the complex-valued attention data based on an ego-motion estimation model, and control any one or any combination of a velocity, an acceleration, and steering of the vehicle based on the ego-motion information.

In another general aspect, a processor-implemented method of performing an operation using a complex-valued attention network includes: generating complex-valued input data from raw radar data; determining complex-valued attention data by applying the complex-valued input data to a complex-valued attention network model; and determine ego-motion information based on the complex-valued attention data.

The determining of the complex-valued attention data may include: extracting a complex-valued attention weight from the complex-valued input data; and determining the complex-valued attention data by applying the extracted complex-valued attention weight to the complex-valued input data.

Other features and aspects will be apparent from the following detailed description, the drawings, and the claims.

Figure 1:
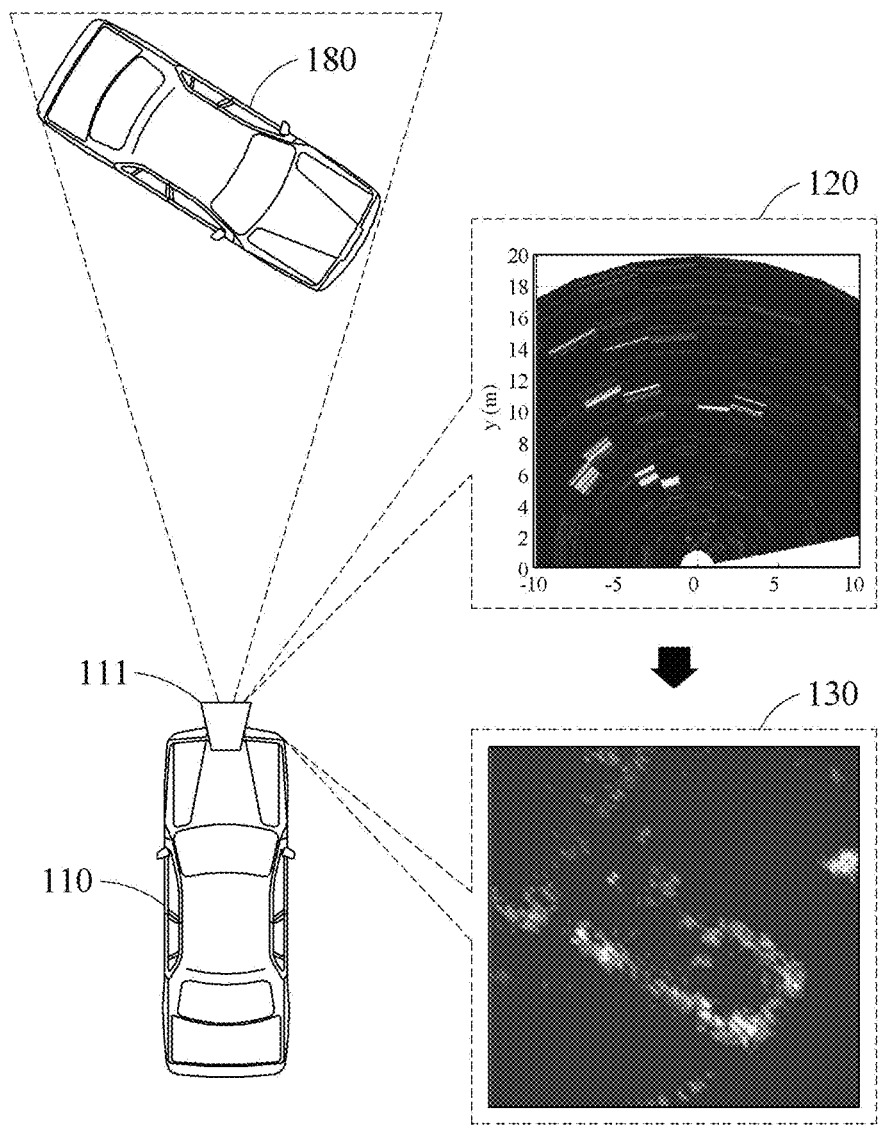
FIG. 1 illustrates an example of a recognition of a surrounding environment using a radar data processing method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, examples will be described in detail with reference to the accompanying drawings. The scope of the examples, however, should not be construed as limited to the examples set forth herein. Like reference numerals in the drawings refer to like elements throughout the present disclosure.

Various modifications may be made to the following examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms (for example, "a", "an", and "the") are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or a combination thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined herein, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

FIG. 1 illustrates an example of a recognition of a surrounding environment using a method of processing radar data.

A radar data processing apparatus 110 may detect an object 180 located in front of a vehicle of the data processing apparatus 110 using a sensor. For example, the sensor to detect the object may include an image sensor, a light detection and ranging (lidar) sensor, an ultrasonic sensor, and/or a radio detection and ranging (radar) sensor. Using the sensor, a distance to the object 180, an angle with the object 180, and a speed of the object 180 may be detected. The radar data processing apparatus 110 may estimate a more precise position and posture by combining different types of sensors, or global navigation satellite system (GNSS) information, inertial measurement unit (IMU) information, and vehicle-to-everything (V2X) communication information.

An example in which the sensor is a radar sensor 111 is described with reference to FIG. 1. The radar data processing apparatus 110 may analyze a radar signal received by the radar sensor 111 and may detect a distance to the object 180. The radar sensor 111 may be located inside or outside the radar data processing apparatus 110 or the vehicle. The radar sensor 111 may radiate a radar signal toward the outside of the radar data processing apparatus 110. The radar data processing apparatus 110 may also detect the distance to the object 180 based on data collected by other sensors (for example, an image sensor) as well as the radar signal received from the radar sensor 111.

The radar data processing apparatus 110 may be installed in the vehicle. The vehicle may perform, for example, an adaptive cruise control (ACC) operation, an autonomous emergency braking (AEB) operation, and/or a blind spot detection (BSD) operation based on a distance to an object detected by the radar data processing apparatus 110.

Also, the radar data processing apparatus 110 may generate a surrounding map 130, in addition to detecting a distance. The surrounding map 130 may be a map that shows locations of targets present in the vicinity of the radar data processing apparatus 110. For example, a target around the radar data processing apparatus 110 may be a dynamic object (such as a vehicle or a person) or a static object (such as a background, a guardrail, or a traffic light).

To generate the surrounding map 130, a single scan image method may be used. The single scan image method may be a method of acquiring a single scan image 120 from a sensor (e.g., the radar sensor 111) and generating the surrounding map 130 from the acquired scan image 120 using the radar data processing apparatus 110. The single scan image 120 may be an image generated from a radar signal sensed by a single radar sensor, that is, the radar sensor 111, and may have a relatively low resolution. The single scan image 120 may be a radar scan image, and may represent distances indicated by radar signals received at an arbitrary elevation angle by the radar sensor 111. For example, in the single scan image 120 of FIG. 1, a horizontal axis represents a steering angle of the radar sensor 111 and a vertical axis represents a distance from the radar sensor 111 to a target. However, a form of the single scan image 120 is not limited to that of FIG. 1, and the single scan image 120 may be expressed in a different format depending on a design.

A two-dimensional (2D) image map, for example, a range-Doppler map and a range-angle map, is mainly described in a radar scan image, however, examples are not limited thereto. For example, a map in a format of three-dimensional (3D) or higher, for example, a range-Doppler-angle map, may be configured. A steering angle may be an angle corresponding to a direction from the radar data processing apparatus 110 to a target point. For example, the steering angle may be an angle between a central axis of a field of view (FOV) of a radar sensor and a distance oriented towards a target point, based on the radar data processing apparatus 110 (for example, a vehicle). For example, a range-Doppler map may represent a Doppler velocity of an arbitrary target and a distance from the radar sensor 111 to the target. In the range-Doppler map, an axis may represent the Doppler velocity (for example, a radial velocity) and another axis may represent the distance. Similarly, a range-angle map may represent an angle of arrival (AOA) corresponding to an arbitrary target and a distance from the radar sensor 111 to the target. In the range-angle map, an axis may represent the AOA and another axis may represent the distance.

The radar data processing apparatus 110 may obtain accurate information about a shape of a target based on a multi-radar map. The multi-radar map may be generated from a combination of a plurality of radar scan images. For example, the radar data processing apparatus 110 may generate the surrounding map 130 by spatially and temporally combining radar scan images acquired by a movement of the radar sensor 111.

As described above, the radar data processing apparatus 110 may generate an arbitrary scan image by processing raw radar data generated from the radar signal, and may generate travelling-related information such as the surrounding map 130 based on the generated scan image, or may perform object recognition. To enhance an accuracy in the generating of the travelling-related information and the object recognition, a scan image with a relatively high resolution may be used. In the present disclosure, a resolution may be a measure in which an image is expressed in detail, and a resolving power unit may be a minimum unit of a capability of a device for identifying a small difference and may represent a minimum unit used to distinguish two objects that are apart from each other (for example, a minimum distinguishable distance unit, a minimum angle unit, and a minimum velocity unit). The resolution may be inversely proportional to a resolving power and/or a resolving power unit. For example, when a resolving power unit of a device decreases, a resolution of acquired data may increase.

However, due to a limitation of a form factor and a part such as a radio frequency integrated circuit (RFIC) of a radar sensor, an amount of information of raw radar data acquired by a single radar sensor of a typical radar data processing apparatus may be limited. When such an amount of information of raw radar data to be acquired by a single radar sensor is limited, a resolution of a scan image generated by typical radar data processing apparatus from the raw radar data may also be restricted.

Figure 2:
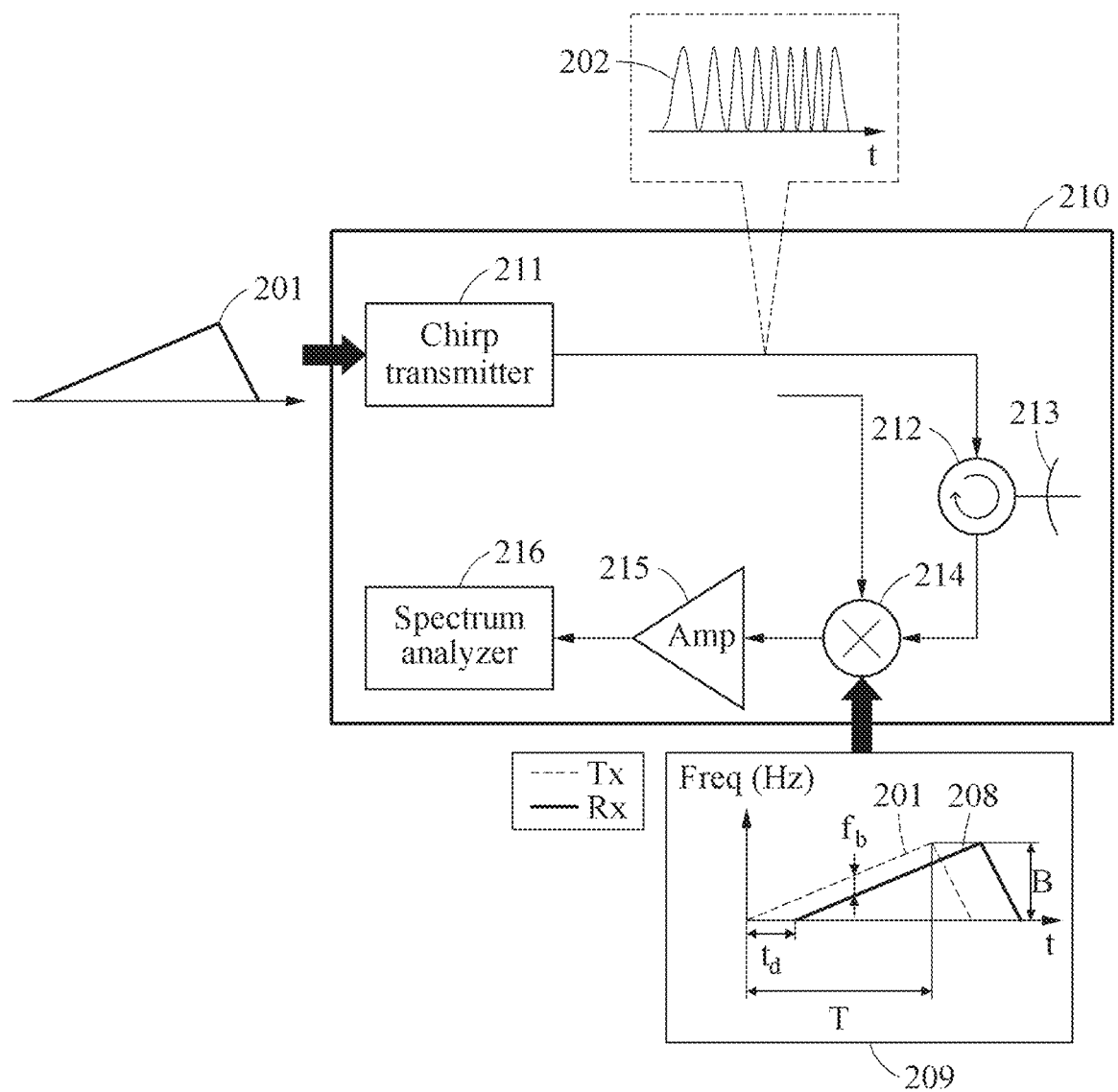
FIG. 2 illustrates an example of a configuration of a radar sensor.

FIG. 2 illustrates an example of a configuration of a radar sensor 210.

The radar sensor 210 may radiate a signal through an antenna 213 and receive a signal through the antenna 213. The signal radiated by the radar sensor 210 and the signal received by the radar sensor 210 may be referred to as a radar signal. The radar sensor 210 may be, for example, a millimeter wave (mmWave) radar, and may be configured to measure a distance to an object by analyzing a change in a signal waveform and a time of flight (TOF) that a radiated electric wave returns after hitting an object. The radar sensor 210 may be implemented as, for example, a frequency-modulated continuous-wave (FMCW) radar, however, examples are not limited thereto.

A chirp transmitter 211 of the radar sensor 210 may generate a frequency-modulated (FM) signal 202 with a frequency changing over time. For example, the chirp transmitter 211 may generate the FM signal 202 by modulating a frequency of a chirp signal 201. The chirp signal 201 may be a signal having an amplitude linearly increasing or decreasing over time. The chirp transmitter 211 may generate the FM signal 202 having a frequency corresponding to the amplitude of the chirp signal 201. For example, as shown in FIG. 2, the FM signal 202 may have a waveform of a gradually increasing frequency in an interval in which the amplitude of the chirp signal 201 increases, and may have a waveform of a gradually decreasing frequency in an interval in which the amplitude of the chirp signal 201 decreases. However, a form of the chirp signal 201 is not limited to that of FIG. 2. The chirp transmitter 211 may transfer the FM signal 202 to a duplexer 212 of the radar sensor 210.

The duplexer 212 may determine a transmission path and a reception path of a signal through the antenna 213. For example, while the radar sensor 210 is radiating the FM signal 202, the duplexer 212 may form a signal path from the chirp transmitter 211 to the antenna 213, may transfer the FM signal 202 to the antenna 213 through the formed signal path, and may externally radiate the FM signal 202.

While the radar sensor 210 is receiving a signal reflected from an object, the duplexer 212 may form a signal path from the antenna 213 to a spectrum analyzer 216. The antenna 213 may receive a signal that is reflected and returned after a radiated signal arrives at an obstacle, and the radar sensor 210 may transfer the reflected signal through the signal path from the antenna 213 to the spectrum analyzer 216.

A frequency mixer 214 may demodulate a received signal to a linear signal (for example, an original chirp signal) of which a frequency is not modulated. An amplifier 215 may amplify an amplitude of the linear signal.

The spectrum analyzer 216 may compare the radiated chirp signal 201 to a signal 208 that is reflected from an object and that is returned. The spectrum analyzer 216 may detect a frequency difference between the radiated chirp signal 201 and the reflected signal 208. The frequency difference between the radiated chirp signal 201 and the reflected signal 208 may indicate a constant difference during an interval in which an amplitude of the radiated chirp signal 201 linearly increases based on a time axis in a graph 209 of FIG. 2, and may be proportional to a distance between the radar sensor 210 and the object. Thus, the distance between the radar sensor 210 and the object may be derived from the frequency difference between the radiated chirp signal 201 and the reflected signal 208. The spectrum analyzer 416 may transmit analyzed information to a processor of a radar data processing apparatus (e.g., the radar data processing apparatus 110). The information transmitted to the processor may be data generated based on a radar signal sensed by the radar sensor, and may be represented as raw radar data.

Figure 3:
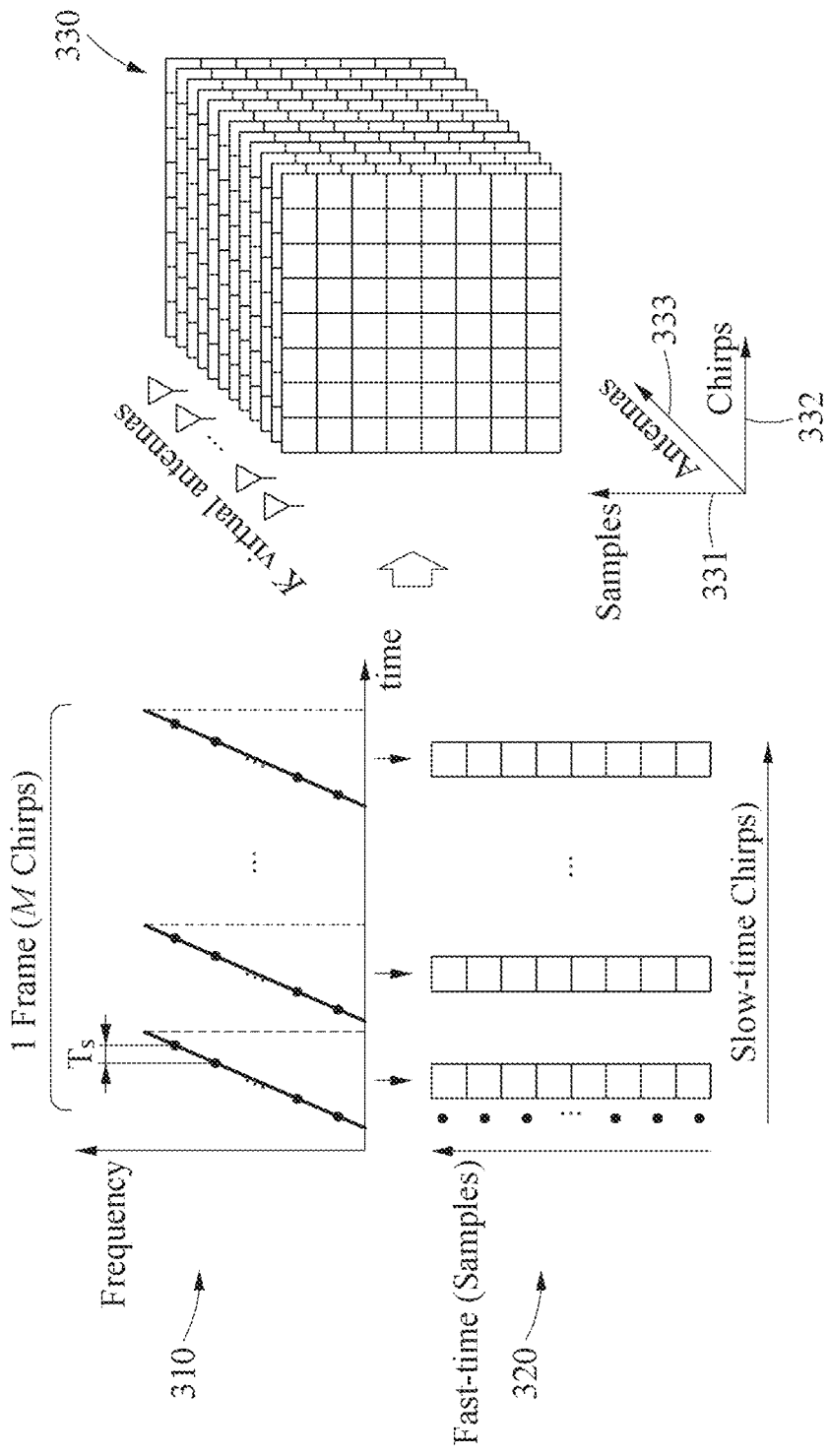
FIG. 3 illustrates an example of raw radar data.

FIG. 3 illustrates an example of raw radar data.

A radar signal of one frame may include a plurality of chirp signals. One frame may correspond to one scan. For example, a radar signal of one frame may include "M" chirp signals. A radar sensor may radiate "M" chirp signals during one scan and may sense signals corresponding "M" reflected chirp signals. In this example, "M" may be an integer greater than or equal to "1". A frequency change tendency 310 of the radar signal shown in FIG. 3 may include frequency change tendencies over time for each of the "M" chirp signals.

The above-described radar signal of one frame may be interpreted based on a fast time axis and a slow time axis. The slow time axis may be a time axis separated by chirp signals, and the fast time axis may be a time axis in which frequency changes of individual chirp signals are observable.

In the fast time axis, a bit signal corresponding to each chirp signal may be sampled at "N" sampling points. The bit signal may be a signal with a frequency difference between a transmission signal and a reflected signal of the transmission signal, and may be represented as an intermediate frequency (IF) signal. For example, an individual chirp signal may be radiated, may arrive at a target and may be reflected from the target, and the reflected signal may be received by a radar sensor. A value of a bit signal between the radiated chirp signal and the reflected signal may be sampled. A bit signal corresponding to each chirp signal included in the radar signal may be sampled at each sampling interval $T_s$. In other words, "N" sample values 320 may be acquired from a bit signal corresponding to one chirp signal. The radar signal may include "M" chirp signals per frame and "K" virtual antennas may individually receive radar signals, and thus "N×M×K" sample values in total may be obtained. Raw radar data 330 may be a data cube configured in "N×M×K" dimensions based on a sample axis 331, a chirp axis 332 and an antenna axis 333. However, the raw radar data 330 is not limited to the data cube of FIG. 3, and may vary depending on a design.

Figure 4:
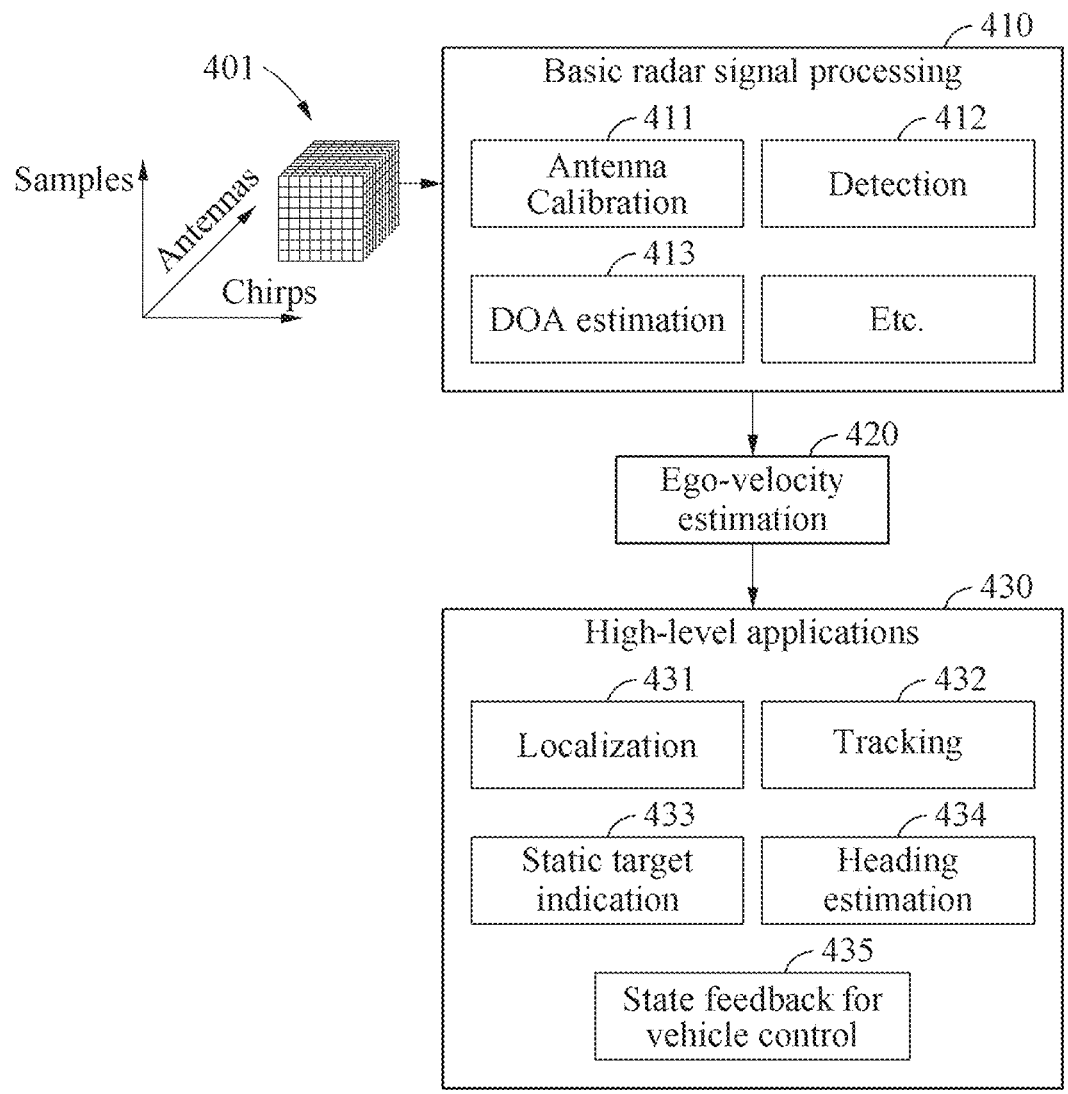
FIG. 4 illustrates an example of a radar signal processing and a vehicle control.

FIG. 4 illustrates an example of a radar signal processing and a vehicle control.

A basic radar signal processing 410 may be applied to raw radar data 401. The basic radar signal processing 410 may include, for example, an antenna calibration 411, a target detection 412, and a direction-of-arrival (DOA) estimation 413.

A sample axis of the raw radar data 401 may be converted into a range axis by the antenna calibration 411. A chirp axis of the raw radar data 401 may be converted into a velocity axis by the target detection 412. The target detection 412 may include, for example, a non-coherent integration, and a constant false alarm rate (CFAR) scheme for a potential object detection. A velocity may be a relative velocity, and may include, for example, a Doppler velocity that is a radial velocity from a target point toward a radar sensor. An antenna axis of the raw radar data 401 may be converted into an angle axis by the DOA estimation 413. For convenience of description, a horizontal angle axis is mainly described as the angle axis, and a result obtained by applying the basic radar signal processing 410 may be a 3D data cube. However, examples are not limited thereto. For example, the angle axis may be two axes, for example, a horizontal angle axis and an elevation angle. In this example, the result obtained by applying the basic radar signal processing 410 may be a four-dimensional (4D) data cube.

Based on data to which the basic radar signal processing 410 is applied, an ego-motion estimation 420 may be performed. A velocity and an angular velocity of a radar sensor itself may be estimated by the ego-motion estimation 420. High-level applications 430, for example, a localization 431, an object tracking 432, a static target indication 433, a heading estimation 434, and state feedback 435 for a vehicle control, may be performed based on ego-motion information determined by the ego-motion estimation 420.

For example, in the basic radar signal processing 410, a performance of a subsequent processing may vary depending on a processing order. The performance of the subsequent processing may depend on results of preceding processing. For example, an accuracy of the DOA estimation 413 may vary depending on a result of the target detection 412. Also, an omission and/or a false alarm in the target detection 412 may have a great influence on a performance of the ego-velocity estimation 420 and subsequent high-level applications 430.

In addition, an error may occur in the typical radar data processing apparatus due to a Doppler ambiguity. For example, a velocity of a target may be estimated from a phase difference between temporally adjacent chirp signals. In this example, when the phase difference exceeds 180 degrees, an ambiguity may occur in the velocity estimation of the typical radar data processing apparatus. For example, when a velocity of −100 km/h to 100 km/h is configured to be estimated, the typical radar data processing apparatus may inaccurately estimate a target with an actual velocity of 120 km/h as a velocity of −80 km/h. When an interval between chirp signals by the same antenna decreases, a velocity ambiguity may decrease. When a number of antennas increases, an angular resolving power may increase. When the number of antennas increases, a time-division multiplexing section within one frame may increase, and accordingly an interval between chirp signals may increase. In other words, the angular resolving power and a maximum detectable velocity may be traded off from each other in a radar. When a velocity of a target is assumed to be fixed during one frame, the typical radar data processing apparatus may not estimate information of an acceleration level.

In contrast to the aforementioned problems of the typical radar data processing apparatus, a radar data processing apparatus of one or more embodiments may estimate ego-motion information with a high accuracy using a complex-valued attention network model, examples of which will be further described below, regardless of a sequential processing chain of the basic radar signal processing 410. The radar data processing apparatus may generate attention data for complex-valued input data, and may estimate ego-motion information from which a Doppler ambiguity is removed, that has a maximum detectable velocity and a high angular resolution and that includes information of an acceleration level, based on the attention data.

Figure 5:
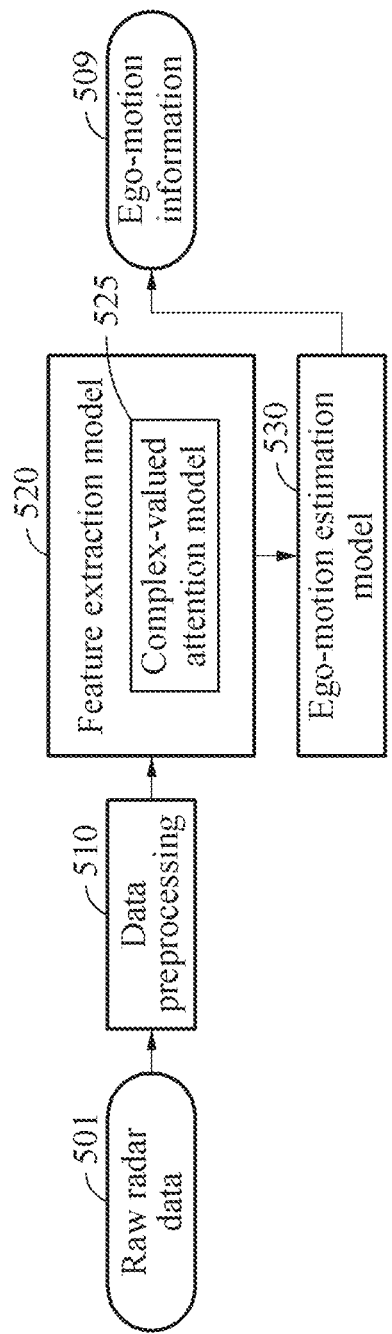
FIG. 5 illustrates an example of estimating ego-motion information.

FIG. 5 illustrates an example of estimating ego-motion information.

A radar data processing apparatus may generate complex-valued input data by applying data preprocessing 510 to raw radar data 501 every frame. The radar data processing apparatus may extract feature data from the complex-valued input data based on a feature extraction model 520. For example, the radar data processing apparatus may calculate attention data with a portion of channels emphasized as feature data from the complex-valued input data based on a complex-valued attention model 525. The feature data may be data indicating a feature obtained by abstracting the complex-valued input data.

The radar data processing apparatus may estimate ego-motion information 509 from the extracted feature data based on an ego-motion estimation model 530. The ego-motion information 509 may include any one or any combination of an ego velocity, an ego angular velocity, an ego acceleration, a location, a heading direction, and a posture of any one of a radar sensor, the radar data processing apparatus, and a vehicle in which the radar data processing apparatus is mounted.

The feature extraction model 520 may be a model designed to extract feature data from input data, and may include a neural network. The complex-valued attention model 525 may be a model designed to output complex-valued attention data from complex-valued input data, and may include a complex-valued neural network.

A neural network may refer to a model that performs a desired task using a large number of nodes connected via edges. For example, the neural network may include a plurality of layers that each include a plurality of nodes, edges that connect a plurality of nodes included in each layer to nodes included in another layer, and a connection weight (for example, a connection strength) of each edge. For example, the neural network may be implemented by hardware, or a combination of software and hardware. The neural network may include a plurality of layers, for example, an input layer, a hidden layer, and an output layer. The input layer may receive an input to perform training or recognition and may transfer the input to the hidden layer, and the output layer may generate an output of the neural network based on values received from the hidden layer. Outputs of previous nodes included in a previous layer may be input to each layer through edges with connection weights. Based on values obtained by applying connection weights to outputs of previous nodes and an activation function, outputs of nodes included in a corresponding layer may be generated.

For example, the above-described neural network may be trained by supervised learning, a gradient descent scheme, and back-propagation learning. For example, each neural network may be trained based on training data that includes a pair of a training input and a training output (for example, a ground truth). In an example, a neural network may calculate a temporary output in response to a training input. The temporary output may be an output value that is temporarily output based on a training input by a neural network model (for example, a temporary model) that is being trained. Connection weights may continue to be updated based on a result of an objective function that is based on the temporary output and the training output, and training may be iteratively performed. The objective function may be a function defined to measure optimalities of connection weights currently set for a neural network, and may be, for example, a loss function. Parameters (for example, connection weights) of the neural network may be updated so that a value of a loss function may be minimized. However, the above-described training of the neural network is merely an example, and examples are not limited thereto. For example, unsupervised learning may also be applied.

The radar data processing apparatus of one or more embodiments may estimate ego-motion information including an acceleration component at a single point in time even for complex-valued input data of a single frame, instead of requiring data of a plurality of time frames as in a typical radar data processing apparatus.

Also, the radar data processing apparatus may calculate ego-motion information from complex-valued input data, using end-to-end (E2E) deep learning. In other words, since a static target identification, a target detection and a DOA detection are not required before an ego-motion estimation, unlike a typical radar signal processing, the radar data processing apparatus of one or more embodiments may exhibit a more stable performance. Also, since the target detection and the DOA detection are not required, unlike a typical radar signal processing, assumptions in the basic radar signal processing (for example, the same target velocity during a series of chirps, a maximum detectable speed limit, or an angular resolving power) may not be used. Thus, the radar data processing apparatus of one or more embodiments may calculate an acceleration by processing radar data based on complex values, the maximum detectable velocity may not be limited, and angle information with a relatively high resolution may be processed.

The radar data processing apparatus may discriminate a static target from a moving target based on ego-motion information. The radar data processing apparatus may perform radar imaging on surroundings. A processor of the radar data processing apparatus may be integrated with an individual radar sensor, however, examples are not limited thereto. For example, the processor may also be implemented as a central processor that is a signal processor separate from the radar sensor.

Figure 6:
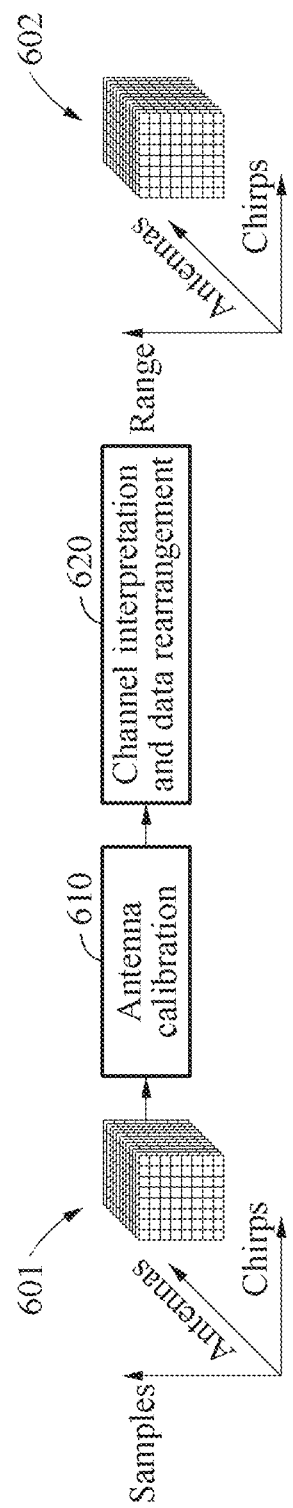
FIG. 6 illustrates an example of preprocessing.

FIG. 6 illustrate an example of preprocessing (e.g., the data preprocessing 510).

A radar data processing apparatus may apply an antenna calibration 610 to raw radar data 601. The antenna calibration 610 may be a basic preprocessing operation for the raw radar data 601, and may include, for example, an operation of compensating for a channel gain and/or a phase error.

The radar data processing apparatus may apply a channel interpretation and data rearrangement operation 620 to data to which the antenna calibration 610 is applied.

A channel interpretation may include a lossless invertible transformation, for example, a fast Fourier transformation (FFT). For example, the radar data processing apparatus may respectively transform information along a chirp axis and an antenna axis of the raw radar data 601 to information along a velocity axis and an angle axis.

A data rearrangement may include a rearrangement operation for an input of a feature extraction model and/or a complex-valued attention model. Data obtained by rearranging the raw radar data 601 may be radar data 602. The radar data 602 may have a plurality of dimensions, and may include, for example, a range-related dimension, a horizontal angle-related dimension, an elevation angle-related dimension, and a radial velocity-related dimension. In the present specification, an example in which a dimension of the radar data 602 includes a range-related dimension, a horizontal angle-related dimension, and a radial velocity-related dimension is mainly described.

A range-related dimension may represent a change in a frequency of a chirp signal. The change in the frequency of the chirp signal may be information shown on a fast time axis, and a distance between a radar sensor and an object may be calculated from a frequency difference between a transmission signal and a reception signal in the radar sensor.

An angle-related dimension may represent a change in virtual antennas. For example, a radar sensor may use a plane wave and may be arranged in a uniform linear array (ULA). In this example, a radar signal transmitted through a predetermined transmission (TX) antenna may be received by a plurality of reception (RX) antennas. Adjacent RX antennas may be spaced apart from each other by a distance of $\Delta d$, and accordingly the RX antennas may receive reception signals with different phases with respect to a signal radiated from the same TX antenna. Based on the above phase difference, the radar data processing apparatus may estimate a DOA. For example, when a DOA is estimated through simple digital beam forming (DBF), an angular resolution may be inversely proportional to a total number of virtual antennas. The number of virtual antennas may correspond to a product of a number of TX antennas and a number of RX antennas.

A radial velocity-related dimension may represent information about a change between a plurality of chirp signals. For example, when an object is moving, phases of a plurality of chirp signals that are continuously reflected and received from the object may change, and a radial velocity of the object may be estimated from information about the above change in the phases of the plurality of chirp signals. The radial velocity-related dimension may be referred to as a velocity-related dimension.

In an example, the radar data processing apparatus may rearrange data by setting one of a plurality of dimensions (for example, the range-related dimension, the radial velocity-related dimension, and the angle-related dimension that are described above) of the radar data 602 as a channel axis, and by aligning the other dimensions based on the channel axis. One of the plurality of dimensions may be selected as a channel axis, and a map for the other dimensions may be generated for each individual channel.

In an example, the radar data processing apparatus may set a range axis transformed from a sample axis as a channel axis, and may align values that are based on the other axes, that is, an angle axis and a velocity axis. The radar data processing apparatus may determine velocity-angle maps for each individual range of the range axis set as the channel axis. For example, the radar data processing apparatus may determine a velocity-angle map for 10 meters (m) and a velocity-angle map for 20 m. A velocity-angle map may include a plurality of elements identified by a relative velocity and an angle based on the radar sensor, and each of the elements in the velocity-angle map may have a value corresponding to an intensity of a signal reflected from a point indicated by a corresponding relative velocity and a corresponding angle based on the radar sensor within a radar FOV. A velocity-angle map for an arbitrary range may include elements having values corresponding to an intensity of a signal reflected from a point indicated by an individual relative velocity and an individual angle at the range. The rearranged data may have velocity-angle maps for each range channel. A value of an element of a velocity-angle map may be a complex value, examples of which will be further described below with reference to FIG. 8.

Although an example in which the range-related dimension is set as a channel axis has been mainly described for convenience of description, examples are not limited thereto. In an example, when an angle-related dimension is selected as a channel, range-velocity maps may be arranged for each angle channel. In another example, when a velocity-related dimension is selected as a channel, range-angle maps may be arranged for each velocity channel.

Figure 7:
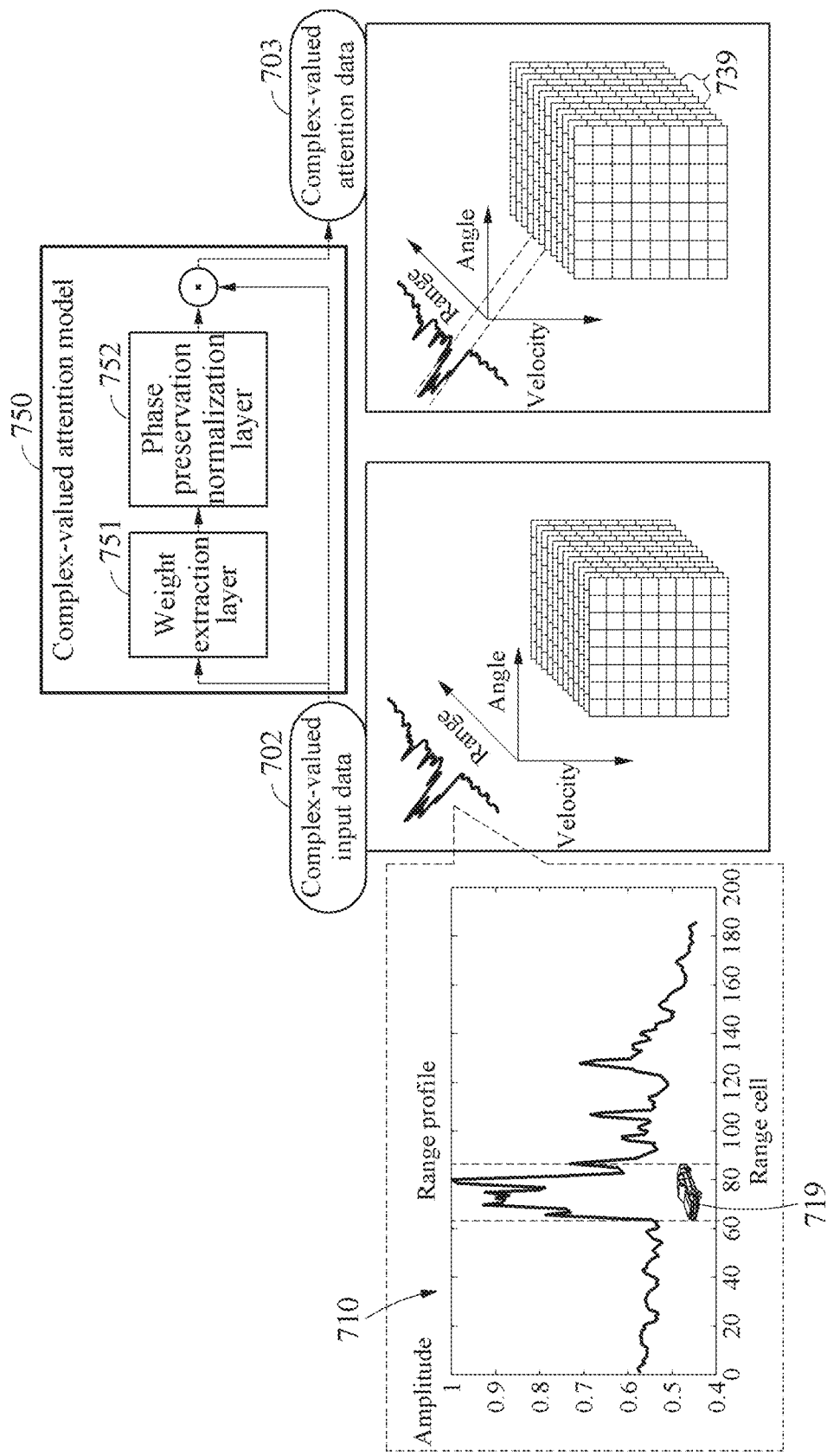
FIGS. 7 and 8 illustrate examples of a complex-valued attention model.
Figure 8:
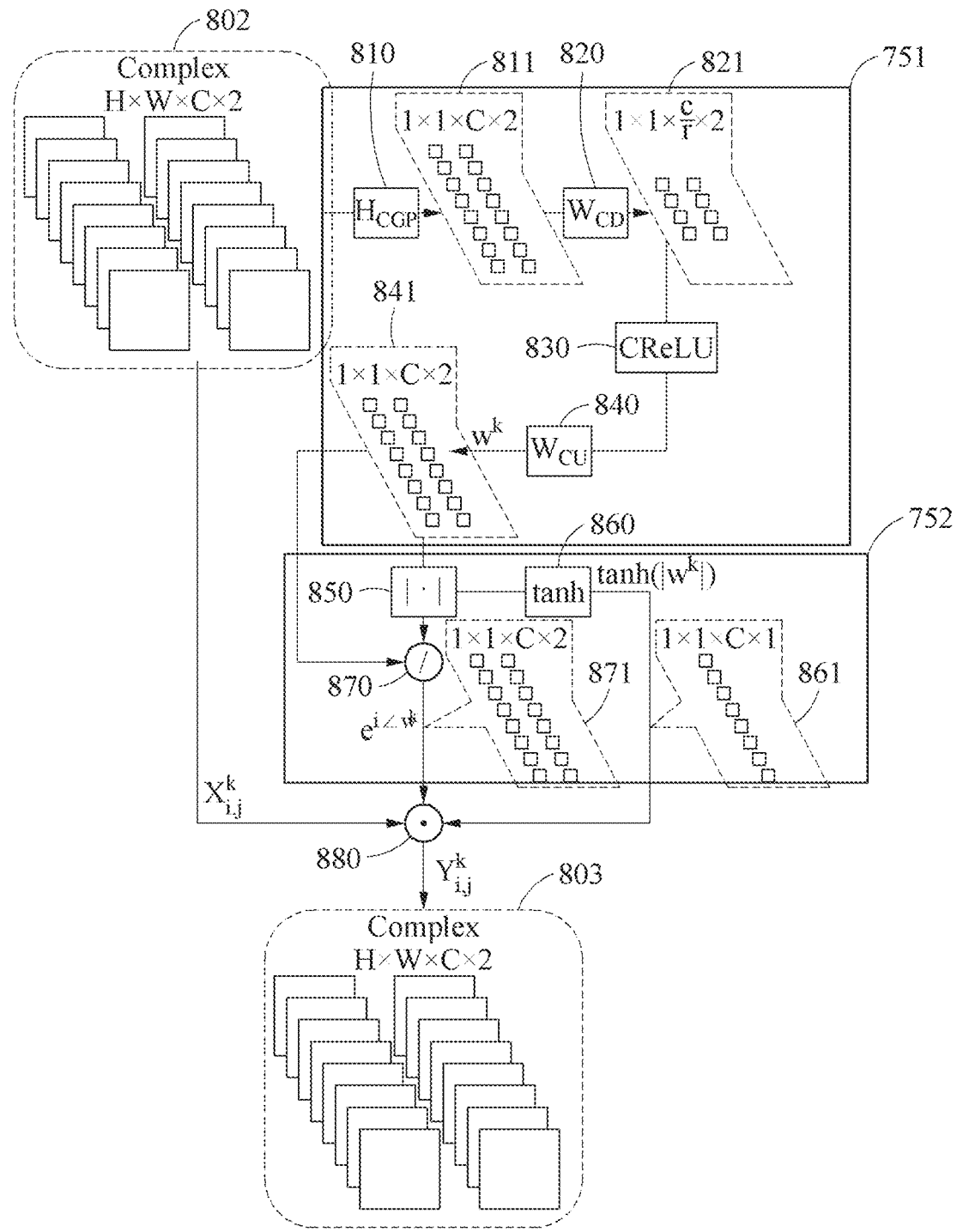

FIGS. 7 and 8 illustrate examples of a complex-valued attention model.

A radar data processing apparatus may calculate complex-valued attention data 703 from complex-valued input data 702 based on a complex-valued attention model 750. The complex-valued input data 702 may be input data with complex values, and may include, for example, a pair of an input map (for example, a real input map) of real components and an input map (for example, an imaginary input map) of imaginary components for each channel.

The complex-valued attention data 703 may be data focused on a map corresponding to at least a portion of a plurality of channels in the complex-valued input data 702. Feature maps determined to be important for each channel may be emphasized based on importance. For example, as shown in FIG. 7, the complex-valued input data 702 may be radar data transformed from raw radar data and may be a data cube in which a range dimension is selected as a channel. Although the data cube is illustrated as a single cube for convenience of description, the data cube may include a pair of a data cube for imaginary components and a data cube for real components. Referring to a range profile 710, a relative high amplitude may be shown in a range cell corresponding to a range in which a target 719 is present among range cells. The radar data processing apparatus may calculate the complex-valued attention data 703 by emphasizing maps corresponding to channels 739 among a plurality of channels (e.g., where the maps corresponding to the channels 739 correspond to the range in which the target 719 is present). An example of calculating the complex-valued attention data 703 will be further described below.

The radar data processing apparatus may extract a complex-valued attention weight from the complex-valued input data 702. For example, the radar data processing apparatus may extract a complex-valued attention weight using a first layer (for example a weight extraction layer 751) of the complex-valued attention model 750. The extracted complex-valued attention weight may indicate an unrestricted magnitude.

The radar data processing apparatus may calculate the complex-valued attention data 703 by applying the extracted complex-valued attention weight to the complex-valued input data 702. For example, the radar data processing apparatus may normalize a magnitude of the complex-valued attention weight while preserving a phase of the complex-valued attention weight. The radar data processing apparatus may normalize the magnitude of the complex-valued attention weight using a second layer (for example, a phase preservation normalization layer 752) of the complex-valued attention model 750. The radar data processing apparatus may apply the normalized weight to the complex-valued input data 702.

FIG. 8 further illustrates an example of a complex-valued attention model.

Complex-valued input data 802 may include a pair of a real input map and an imaginary input map for each channel. For example, when the real input map and the imaginary input map are each vector data with a dimension of H×W, one channel of the complex-valued input data 802 may have a dimension of H×W×2. Thus, a total dimension of the complex-valued input data 802 including "C" channels may be H×W×C×2. In this example, H, W, and C may each be an integer greater than or equal to "1".

The radar data processing apparatus may extract a complex-valued attention weight 841 from the complex-valued input data 802 based on the weight extraction layer 751 of the complex-valued attention model 750 of FIG. 7. The radar data processing apparatus may calculate the complex-valued attention weight 841 by extracting a value indicating a real component and a value indicating an imaginary component from the complex-valued input data 802 for each channel.

For example, the radar data processing apparatus may perform pooling on a real representative value representing a real component and an imaginary representative value representing an imaginary component from the complex-valued input data 802 for each channel. The radar data processing apparatus may apply a global pooling layer 810 to each of the real input map and the imaginary input map for each channel. A pooling result 811 of global pooling $H_{CGP}$ may have a dimension of 1×1×C×2. In other words, a pair of a single real representative value and a single imaginary representative value may be extracted for each channel.

The radar data processing apparatus may generate downscaled data 821 by applying a convolution operation 820 of reducing a number of channels to the pooling result 811 that includes the real component and the imaginary component. For example, a number of channels of the downscaled data 821 may be reduced to C/r. In this example, r may be a divider of C. The downscaled data 821 may include a pair of a real value and an imaginary value for each of the C/r channels.

The radar data processing apparatus may apply a complex-valued activation function 830 to the downscaled data 821. The complex-valued activation function 830 may be, for example, a function changed to apply a real number-based activation function to a complex-valued neural network. For example, various activation functions applicable to complex number data in which real data and imaginary data are concatenated may be used as a function in which a rectified linear unit (ReLU) is changed corresponding to a complex-valued neural network, and may include, for example, CReLU, zReLU, or modReLU.

The radar data processing apparatus may calculate the complex-valued attention weight 841 by applying a convolution operation 840 of increasing a number of channels to downscaled data. A dimension of the complex-valued attention weight 841 may be restored to a dimension of 1×1×C×2 that is the same as that of the pooling result 811. $W^k$ denotes a complex-valued attention weight 841 of a k-th channel among "C" channels, and may include a real number weight value and an imaginary number weight value for the k-th channel. In this example, k may be an integer greater than or equal to "1" and less than or equal to "C".

The radar data processing apparatus may determine a normalized weight from the complex-valued attention weight 841 based on the phase preservation normalization layer 752 of the complex-valued attention model 750. For example, the radar data processing apparatus may determine a real value and an imaginary value of the complex-valued attention weight 841 of which the magnitude is normalized while a phase is preserved, for each channel.

The radar data processing apparatus may perform an absolute value calculation 850 of the complex-valued attention weight 841 for each channel. The radar data processing apparatus may apply an activation function 860 to a calculated absolute value $|w^k|$. Although a hyperbolic tangent (tanh) function is used as the activation function 860, examples are not limited thereto. For example, various functions bounded within a threshold range (for example, a range of "−1" to "1") may be used. Thus, the radar data processing apparatus may calculate bounded magnitude information 861 about a magnitude of the complex-valued attention weight 841 bounded within a threshold range for each channel. $\tanh(|w^k|)$ may indicate a bounded magnitude that is determined based on a tanh function for the k-th channel of the complex-valued attention weight 841. The bounded magnitude information 861 may have a dimension of 1×1×C×1 because a single value for each channel is included.

Also, the radar data processing apparatus may apply a division operation 870 of dividing a complex-valued attention weight 841 of a corresponding channel by the calculated absolute value $|w^k|$ to each channel. An absolute value may be fixed to "1" as a result of the division operation 870, and phase information 871 with a preserved phase component may be calculated. Thus, the radar data processing apparatus may calculate phase information 871 of the complex-valued attention weight 841 for each channel. $e^{i \angle w^k}$ may indicate a phase component of the k-th channel. The phase component may be expressed by a ratio of a real number and an imaginary number, and thus the phase information 871 may include real number values and imaginary number values for each channel, and may have a dimension of 1×1×C×2.

The radar data processing apparatus may individually apply a real value and an imaginary value of the extracted complex-valued attention weight 841 to the real data and the imaginary data of the complex-valued input data 802. For example, the radar data processing apparatus may apply a normalized weight to the real data and the imaginary data of the complex-valued input data 802 for each channel. The radar data processing apparatus may apply a real value of a normalized weight corresponding to one channel to a real input map corresponding to the channel in the complex-valued input data 802. Similarly, the radar data processing apparatus may apply an imaginary value of a normalized weight corresponding to one channel to an imaginary input map corresponding to the channel. The radar data processing apparatus may apply an element-wise operation that is based on a real value of a normalized weight corresponding to an arbitrary channel to all elements of a real input map corresponding to the channel, and may apply an element-wise operation that is based on an imaginary value of a normalized weight corresponding to the channel to all elements of an imaginary input map corresponding to the channel. For example, the radar data processing apparatus may apply the phase information and the bounded magnitude that are calculated for each channel to the complex-valued input data 802 through an element-wise multiplication 880. The radar data processing apparatus may perform the element-wise multiplication 880 between real components of the complex-valued input data 802 and real components of the normalized weight and between imaginary components of the complex-valued input data 802 and imaginary components of the normalized weight, for each channel. For example, $X_{i,j}^k$ may indicate a complex value in a j-th column of an i-th row of a complex-valued input map of the k-th channel in the complex-valued input data 802. $Y_{i,j}^k$ may indicate a complex value in a j-th column of an i-th row of a complex-valued output map of the k-th channel in a result of the element-wise multiplication 880. In this example, i and j may be an integer greater than or equal to "1". Complex-valued attention data 803 may be the result of the element-wise multiplication 880.

As described above, the normalized weight may have a bounded magnitude of the complex-valued attention weight 841 with the preserved phase for each individual channel, and accordingly the complex-valued attention data 803 that is a result obtained by applying the normalized weight to the complex-valued input data 802 may have a characteristic that indicates attention values and/or focused values in units of channels.

Figure 9:
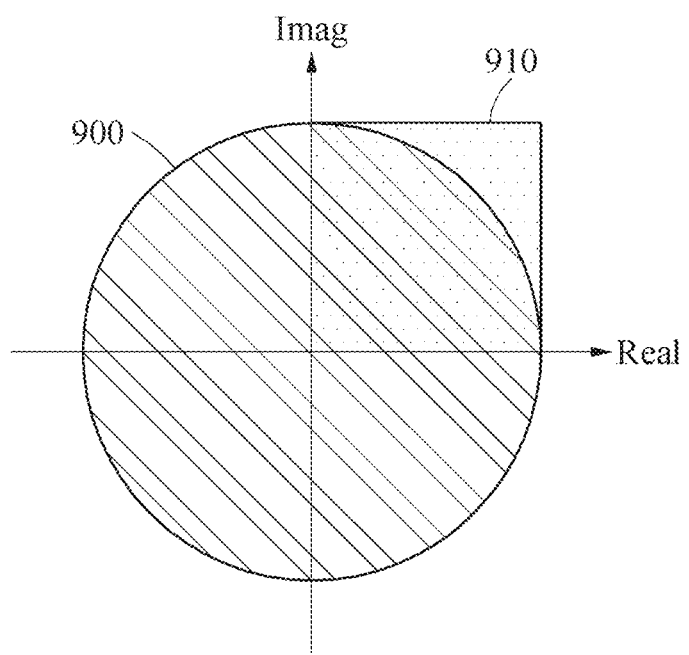
FIG. 9 illustrates an example of bounding of an attention weight.

FIG. 9 illustrates an example of bounding of an attention weight.

For example, when a complex-valued attention weight is applied regardless of a phase, a typical radar data processing apparatus may apply only a value corresponding to a quadrant 910 shown in a complex plane of FIG. 9, which may lead to a distortion in an attention result. In contrast, a radar data processing apparatus of one or more embodiments may bound a magnitude within a threshold range while preserving a phase component, to generate a normalized weight that corresponds to an inner region 900 of a circle having a radius that is a threshold corresponding to the threshold range in the complex plane. The threshold range may be a range of "−1" to "1" and the threshold may be "1", however, examples are not limited thereto.

Figure 10:
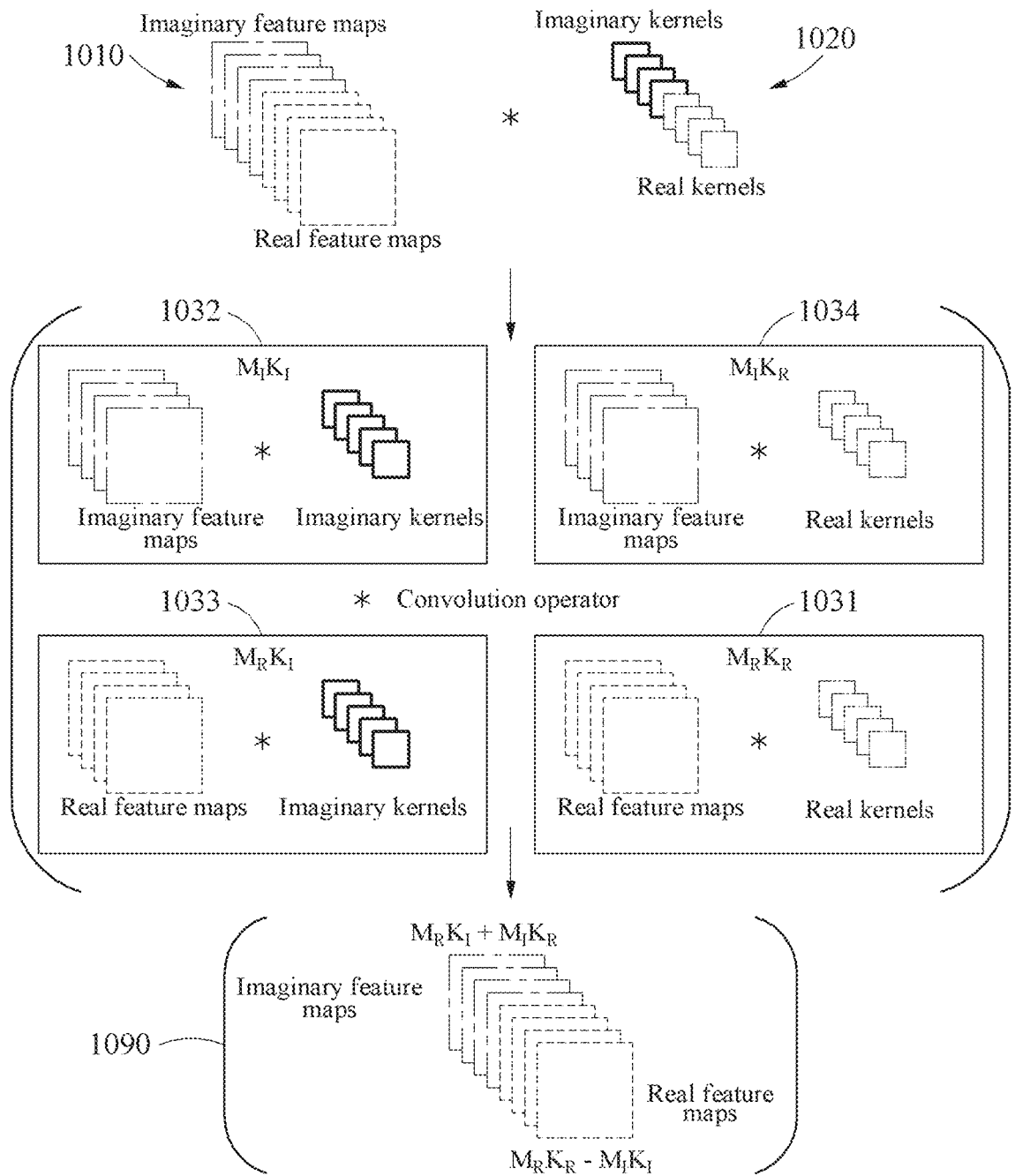
FIG. 10 illustrates an example of a complex-valued convolution operation.

FIG. 10 illustrates an example of a complex-valued convolution operation.

In a complex-valued neural network, an input map 1010 may include a real feature map of real components, and an imaginary feature map of imaginary components. In a complex-valued convolution layer, a convolution operation may be performed using real kernels for real components and imaginary kernels for imaginary components as kernels 1020. In FIG. 10, $M_R$, $M_I$, $K_R$ and $K_I$ may represent a real feature map, an imaginary feature map, a real kernel, and an imaginary kernel, respectively.

For example, the radar data processing apparatus may perform a convolution operation by sweeping a real kernel and an imaginary kernel with respect to a real feature map and an imaginary feature map, for each individual channel. The radar data processing apparatus may calculate $M_R K_R$ as a convolution result 1031 based on a stride of a real kernel for a real feature map for each channel. The radar data processing apparatus may calculate $M_I K_I$ as a convolution result 1032 based on a stride of an imaginary kernel for an imaginary feature map for each channel. The radar data processing apparatus may calculate $M_R K_I$ as a convolution result 1033 based on a stride of an imaginary kernel for a real feature map for each channel. The radar data processing apparatus may calculate $M_I K_R$ as a convolution result 1034 based on a stride of a real kernel for an imaginary feature map for each channel. The radar data processing apparatus may determine a complex-valued convolution output 1090 by combining the convolution results 1031 through 1034 for each real component and for each imaginary component. For example, a result of a multiplication between imaginary components may be a negative real number, and a result of a multiplication between a real component and an imaginary component may be an imaginary number. Thus, the complex-valued convolution output 1090 may include $M_R K_R - M_I K_I$ as a real component, and $M_R K_I + M_I K_R$ as an imaginary component.

Figure 11:
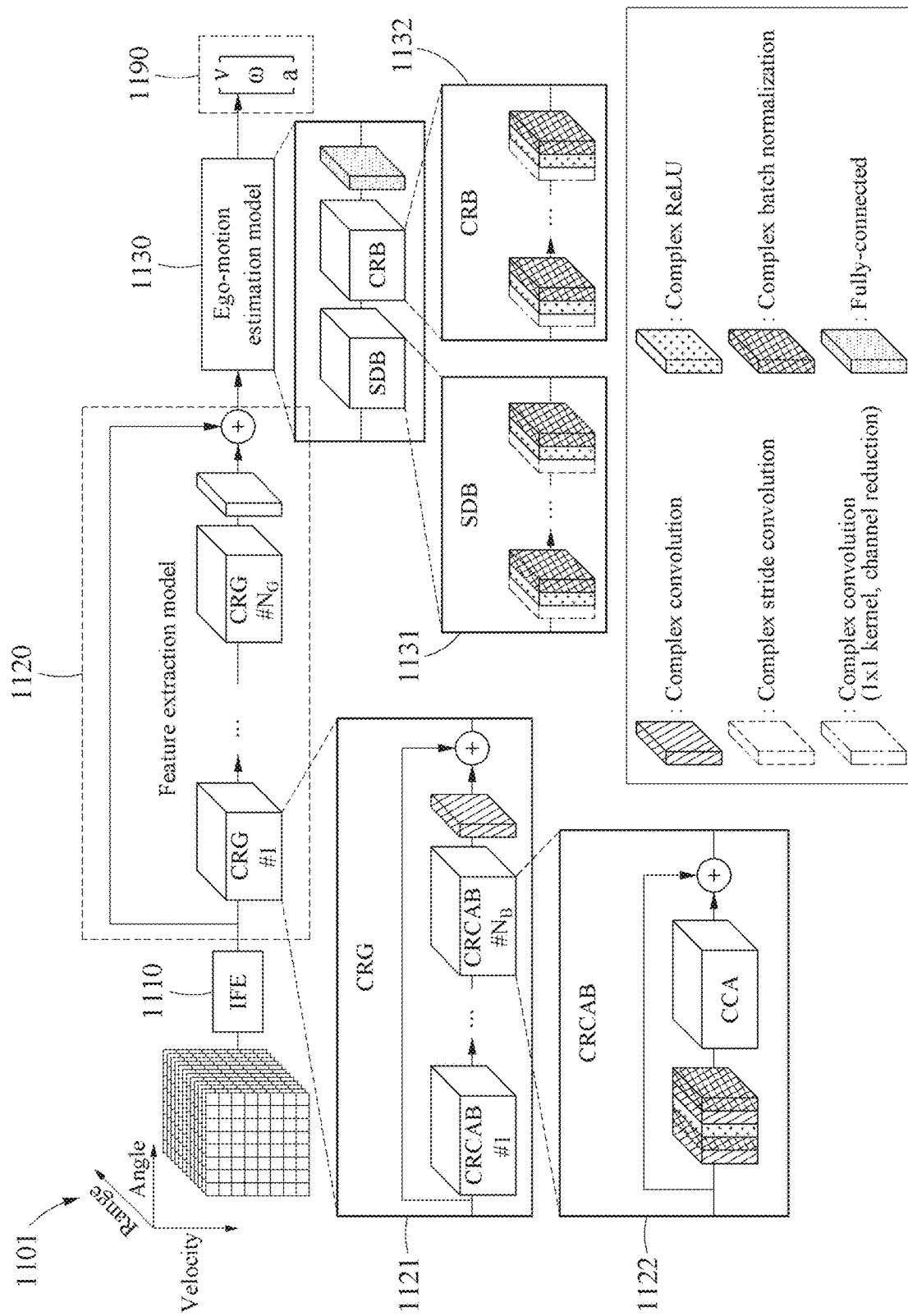
FIG. 11 illustrates an example of estimating ego-motion information from raw radar data.

FIG. 11 illustrates an example of estimating ego-motion information from raw radar data.

A radar data processing apparatus may perform an initial feature extraction (IFE) operation 1110 on raw radar data 1101. For example, the IFE operation 1110 may include a complex convolution operation and a complex batch normalization operation. A sampled value may be converted into a range value, and a Doppler ambiguity may be improved. The radar data processing apparatus may extract complex-valued input data (e.g., the complex-valued input data 702 or 802) through the IFE operation 1110.

The radar data processing apparatus may extract feature data from the complex-valued input data based on a feature extraction model 1120. The feature data may be data of an abstracted feature extracted from the complex-valued input data. The radar data processing apparatus may extract intermediate data through a series of complex-valued residual groups (CRGs) 1121 (for example, CRG #1 through CRG #$N_G$), and may extract feature data through a residual operation of summing the intermediate data and the complex-valued input data.

A CRG 1121 may include a series of complex-valued residual channel attention blocks (CRCABs) 1122 (for example, CRCAB #1 through CRCAB #$N_B$). Each of the CRCABs 1122 may include a complex-valued channel attention (CCA) network for data preprocessed by applying a complex convolution, a complex batch normalization, and a complex activation function (for example, CReLU) from the complex-valued input data. Each of the CRCABs 1122 may apply a residual operation to the complex-valued input data and an output of the CCA network. For example, the radar data processing apparatus may calculate residual data by summing the complex-valued input data and complex-valued attention data (e.g., the complex-valued attention data 703 or 803 as an output of the CCA network), and may apply a complex-valued attention network-based operation to the residual data. The CCA network may be implemented as the complex attention network described above with reference to FIGS. 1 through 10, and thus further description thereof is not repeated herein.

The radar data processing apparatus may calculate ego-motion information 1190 from data (for example, feature data or complex-valued attention data) calculated from the CCA network based on an ego-motion estimation model 1130. For example, the radar data processing apparatus may estimate ego-motion information 1190 of a radar sensor from complex-valued attention data based on the ego-motion estimation model 1130. Also, the radar data processing apparatus may calculate the ego-motion information 1190 from residual data between complex-valued input data and complex-valued attention data based on the ego-motion estimation model 1130.

For example, the ego-motion estimation model 1130 may include a size down-sampling block (SDB) 1131 and a channel-reduction block (CRB) 1132. The SDB 1131 may include a complex stride convolution operation, a complex activation function, and a complex batch normalization operation. The CRB 1131 may include a complex convolution operation, a complex activation function, and a complex batch normalization operation, for reduction of a number of channels. The ego-motion estimation model 1130 may include a fully connected layer as an output layer. Thus, the radar data processing apparatus may compress feature data and/or complex-valued attention data as ego-motion information 1190 based on the ego-motion estimation model 1130. In this example, the complex activation function and the complex batch normalization may vary depending on a design, or may be partially omitted.

Although residual operations are overlappingly performed in the feature extraction model 1120, the CRGs 1121, and the CRCABs 1122 as shown in FIG. 11, examples are not limited thereto. A portion of the residual operations may not be performed.

The radar data processing apparatus may estimate, as ego-motion information 1190, an acceleration of a radar sensor with respect to at least one axis together with an angular velocity and a velocity of the radar sensor. For example, the radar data processing apparatus may calculate a linear velocity v along a longitudinal axis of the radar data processing apparatus, and an angular velocity w about an arbitrary axis. The angular velocity w may be based on a yaw axis, a pitch axis, and a roll axis of the radar data processing apparatus. The radar data processing apparatus may estimate, as ego-motion information 1190, an acceleration a with respect to various axes (for example, a line-of-sight axis of the radar sensor, a linear velocity axis of the radar data processing apparatus, a horizontal axis, or an altitude axis). For example, a longitudinal axis, a latitudinal axis, or a vertical axis of the radar data processing apparatus and/or a vehicle may be estimated based on a degree of freedom (DoF). A configuration of the ego-motion information 1190 may vary depending on a design, and is not limited to the above-described example. The radar data processing apparatus may estimate an acceleration, and thus the radar data processing apparatus may be applied to a higher-level application that uses information of an acceleration level.

Figure 12:
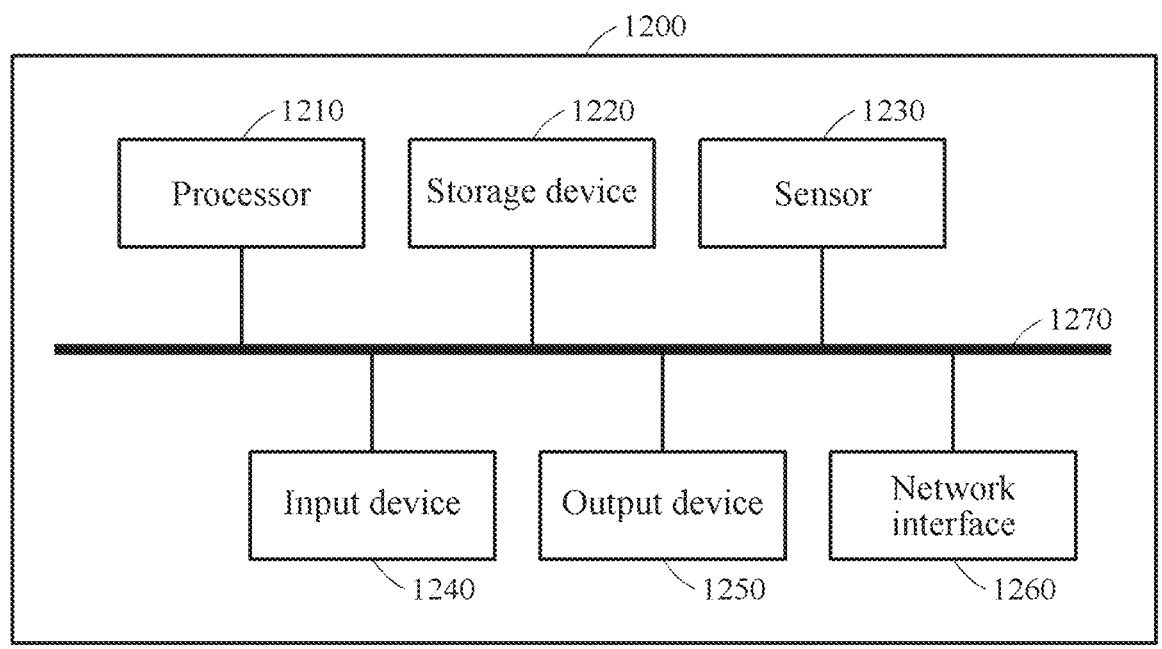
FIG. 12 illustrates an example of a configuration of a computing apparatus.

FIG. 12 illustrates an example of a configuration of a computing apparatus 1200.

Referring to FIG. 12, the computing apparatus 1200 may be implemented as a radar data processing apparatus using the above-described method of processing radar data. However, examples are not limited thereto, and the computing apparatus 1200 may be an apparatus configured to perform an operation using a complex-valued attention network, and may include, for example, an image processing apparatus, a smartphone, a wearable device, a tablet computer, a netbook, a laptop, a desktop computer, a personal digital assistant (PDA), a head-mounted display (HMD), a drone, and/or an autonomous vehicle.

The computing apparatus 1200 of FIG. 12 may include a processor 1210 (e.g., one or more processors), a storage device 1220 (e.g., one or more memories), a sensor 1230, an input device 1240, an output device 1250, and a network interface 1260. The processor 1210, the storage device 1220, the sensor 1230, the input device 1240, the output device 1250, and the network interface 1260 may communicate with each other through a communication bus 1270.

The processor 1210 may execute functions and instructions to be executed in the computing apparatus 1200. For example, the processor 1210 may process instructions stored in the storage 1220. The processor 1210 may perform at least one of the operations described above with reference to FIGS. 1 through 11.

For example, the processor 1210 may generate complex-valued input data from raw radar data. The processor 1210 may extract a complex-valued attention weight from the complex-valued input data using a first layer of a complex-valued attention network model. The processor 1210 may calculate complex-valued attention data by applying the extracted complex-valued attention weight to real data and imaginary data using a second layer of the complex-valued attention network model.

The storage device 1220 may store information or data used for execution of the processor 1210. The storage device 1220 may include a computer-readable storage medium or a computer-readable storage device. The storage device 1220 may store instructions to be executed by the processor 1210, and information associated with execution of software or an application while the software or the application is being executed by the computing apparatus 1200. The storage device 1220 may be a memory, and may store, for example, a complex-valued attention network model.

The sensor 1230 may include a radar sensor, and various types of sensors such as a lidar sensor, a camera sensor, or an infrared sensor. The radar sensor may obtain raw radar data by radiating and receiving a radar signal. When the sensor 1230 is a radar sensor, the above-described processor 1210 may obtain an angle-velocity map for each range channel as complex-valued input data. However, a channel axis of the complex-valued input data is not limited to a range channel, and may vary depending on a design.

The input device 1240 may receive an input from a user through a tactile input, a video input, an audio input, or a touch input. The input device 1240 may include, for example, a keyboard, a mouse, a touchscreen, a microphone, or other devices configured to the input from the user and transmit the detected input.

The output device 1250 may provide a user with an output of the computing apparatus 1200 through a visual channel, an auditory channel, or a tactile channel. The output device 1250 may include, for example, a display, a touchscreen, a speaker, a vibration generator, or other devices configured to provide the user with the output.

The network device 1260 may communicate with an external device through a wired or wireless network.

In an example, the output device 1250 may provide a user with a result of processing a radar signal using any one or any combination of visual information, auditory information, and haptic information.

In an example, when the computing apparatus 1200 is mounted in a vehicle, the above-described processor 1210 may estimate at least one of a position and a heading direction of the vehicle in which a radar sensor is mounted, based on ego-motion information. The computing apparatus 1200 may generate result data that includes any one or any combination of a detection result, an estimation result, a recognition result, a nearby map and an output scan image associated with an object located near the radar sensor, based on the ego-motion information. The output device 1250 may visualize the above-described result data through a display. For example, the output device 1250 may output an estimation result for at least one of the position and the heading direction obtained by the processor 1210. When the output device 1250 is a display, for example, a head-up display (HUD), the display may visualize a current position of the vehicle as a graphical object corresponding to a geographic map.

In another example, when the computing apparatus 1200 is implemented as a vehicle, or is mounted in a vehicle, the processor 1210 may estimate ego-motion information of the vehicle from complex-valued attention data based on an ego-motion estimation model. The processor 1210 may control and/or change any one or any combination of a velocity, an acceleration, and steering of the vehicle in which a radar sensor is mounted, based on the ego-motion information.

Although the radar sensor has been mainly described as a sensor in the present disclosure, the sensor may be implemented as a lidar sensor. The radar data described with reference to FIGS. 1 through 11 may be replaced by lidar data.

The data processing apparatuses, radar sensors, chirp transmitters, duplexers, antennas, frequency mixers, amplifiers, spectrum analyzers, computing apparatuses, processors, storage devices, sensors, input devices, output devices, network interfaces, communication buses, data processing apparatus 110, radar sensor 210, chirp transmitter 211, duplexer 212, antenna 213, frequency mixer 214, amplifier 215, spectrum analyzer 216, computing apparatus 1200, processor 1210, storage device 1220, sensor 1230, input device 1240, output device 1250, network interface 1260, communication bus 1270, apparatuses, units, modules, devices, and other components described herein are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method of performing an operation using a complex-valued attention network, the method comprising:
    extracting a complex-valued attention weight from complex-valued input data using one or more convolution operations;
    normalizing a magnitude of the complex-valued attention weight while preserving a phase of the complex-valued attention weight;
    determining complex-valued attention data by applying the normalized complex-valued attention weight to the complex-valued input data using an element-wise multiplication such that dimensions of the complex-valued attention data correspond to dimensions of the complex-valued input data;
    determining ego-motion information of a vehicle from the complex-valued attention data based on an ego-motion estimation model; and
    controlling any one or any combination of a velocity, an acceleration, and steering of the vehicle based on the ego-motion information.

2. The method of claim 1, wherein the determining of the complex-valued attention data comprises individually applying a real value and an imaginary value of the extracted complex-valued attention weight to real data and imaginary data of the complex-valued input data.

3. The method of claim 2, wherein
    the applying of the normalized complex-valued attention weight to the complex-valued input data comprises applying the normalized weight of the complex-valued attention weight to the real data and the imaginary data for each channel.

4. The method of claim 3, wherein the applying of the normalized weight comprises:
    applying a real value of the normalized weight of the complex-valued attention weight to a real input map of the complex-valued input data for each channel; and
    applying an imaginary value of the normalized weight of the complex-valued attention weight to an imaginary input map of the complex-valued input data for each channel.

5. The method of claim 3, wherein the normalizing of the magnitude of the complex-valued attention weight comprises:
    determining phase information of the complex-valued attention weight for each channel; and
    determining a bounded magnitude of the complex-valued attention weight within a threshold range for each channel.

6. The method of claim 5, further comprising:
    applying the determined phase information and the determined bounded magnitude to the complex-valued input data through the element-wise multiplication.

7. The method of claim 5, wherein values of the normalized weight correspond to an inner region of a circle having a radius that is a threshold corresponding to the threshold range in a complex plane.

8. The method of claim 5, wherein
the determining of the phase information comprises dividing the complex-valued attention weight by an absolute value of the complex-valued attention weight for each channel, and
the determining of the bounded magnitude comprises applying an activation function to the absolute value of the complex-valued attention weight for each channel.

9. The method of claim 1, wherein the extracting of the complex-valued attention weight comprises:
determining the complex-valued attention weight by extracting a value indicating a real component and a value indicating an imaginary component from the complex-valued input data for each channel.

10. The method of claim 9, wherein the determining of the complex-valued attention weight comprises:
performing pooling on a real representative value representing a real component and an imaginary representative value representing an imaginary component from the complex-valued input data for each channel;
generating downscaled data by applying a convolution operation, of the one or more convolution operations, of reducing a number of channels to a result of the pooling including the real component and the imaginary component; and
determining the complex-valued attention weight by applying a convolution operation, of the one or more convolution operations, of increasing a number of channels to the downscaled data.

11. The method of claim 1, further comprising:
obtaining raw radar data based on a radar signal sensed by a radar sensor; and generating the
complex-valued input data by transforming the raw radar data.

12. The method of claim 11, wherein the obtaining of the raw radar data comprises obtaining an angle-velocity map for each range channel as the complex-valued input data.

13. The method of claim 11, further comprising:
for the determining of the ego-motion information, determining the ego-motion information of the radar sensor from the complex-valued attention data based on the ego-motion estimation model.

14. The method of claim 13, wherein the determining of the ego-motion information comprises determining an acceleration with respect to at least one axis together with a velocity and an angular velocity of the radar sensor as the ego-motion information.

15. The method of claim 13, wherein the determining of the ego-motion information comprises determining the ego-motion information from residual data between the complex-valued input data and the complex-valued attention data based on the ego-motion estimation model.

16. The method of claim 13, wherein the radar sensor is mounte in the vehicle.

17. The method of claim 13, further comprising:
determining at least one of a position and a heading direction of the vehicle, in which the radar sensor is mounted, based on the ego-motion information; and
outputting an estimation result for at least one of the position and the heading direction.

18. The method of claim 1, further comprising:
determining residual data by summing the complex-valued input data and the complex- valued attention data, and applying a complex-valued attention network-based operation to the residual data.

19. A non-transitory computer-readable storage medium storing instructions that, when executed by a processor, configure the processor to perform the method of claim 1.

20. A computing apparatus comprising:
a memory configured to store a complex-valued attention network model; and a processor configured to
extract a complex-valued attention weight from complex-valued input data using one or more convolution operations of a first layer of the complex-valued attention network model,
normalize a magnitude of the complex-valued attention weight while preserving a phase of the complex-valued attention weight,
determine complex-valued attention data by applying the normalized complex-valued attention weight to real data and imaginary data of the complex-valued input data using a second layer of the complex-valued attention network model and an element-wise multiplication such that dimensions of the complex-valued attention data correspond to dimensions of the complex-valued input data,
determine ego-motion information of a vehicle from the complex-valued attention data based on an ego-motion estimation model, and
control any one or any combination of a velocity, an acceleration, and steering of the vehicle based on the ego-motion information.

21. A radar data processing apparatus comprising:
a radar sensor configured to obtain raw radar data by radiating and receiving a radar signal; and
a processor configured to
generate complex-valued input data from the raw radar data,
extract a complex-valued attention weight from the complex-valued input data using one or more convolution operations,
normalize a magnitude of the complex-valued attention weight while preserving a phase of the complex-valued attention weight,
determine complex-valued attention data by applying the normalized complex-valued attention weight to real data and imaginary data of the complex-valued input data using an element-wise multiplication such that dimensions of the complex-valued attention data correspond to dimensions of the complex-valued input data,
determine ego-motion information of a vehicle from the complex-valued attention data based on an ego-motion estimation model, and
control any one or any combination of a velocity, an acceleration, and steering of the vehicle based on the ego-motion information.

22. A vehicle comprising:
a radar sensor configured to obtain raw radar data by radiating and receiving a radar signal; and
a processor configured to
generate complex-valued input data from the raw radar data,
extract a complex-valued attention weight from the complex-valued input data using one or more convolution operations,
normalize a magnitude of the complex-valued attention weight while preserving a phase of the complex-valued attention weight,
determine complex-valued attention data by applying the normalized complex-valued attention weight to real data and imaginary data of the complex-valued input data using an element-wise multiplication such that dimensions of the complex-valued attention data correspond to dimensions of the complex-valued input data, determine ego-motion information of the vehicle from the complex-valued attention data based on an ego-motion estimation model, and control any one or any combination of a velocity, an acceleration, and steering of the vehicle based on the ego-motion information.

23. A processor-implemented method of performing an operation using a complex-valued attention network, the method comprising:

generating complex-valued input data from raw radar data;

normalizing a magnitude of a complex-valued attention weight extracted using one or more convolution operations while preserving a phase of the complex-valued attention weight;

determining complex-valued attention data by applying, using an element-wise multiplication, the complex-valued input data to a complex-valued attention network model using the normalized complex-valued attention weight such that dimensions of the complex-valued attention data correspond to dimensions of the complex-valued input data;

determining ego-motion information based on the complex-valued attention data; and controlling any one or any combination of a velocity, an acceleration, and steering of a vehicle based on the ego-motion information.

24. The method of claim 23, wherein the determining of the complex-valued attention data comprises:

extracting the complex-valued attention weight from the complex-valued input data; and determining the complex-valued attention data by applying the normalized complex-valued attention weight to the complex-valued input data.

* * * * *